United States Patent
Li et al.

(10) Patent No.: US 8,989,018 B2
(45) Date of Patent: Mar. 24, 2015

(54) METHOD AND APPARATUS FOR PROVIDING A ROUTE RECOMMENDATION

(75) Inventors: Guangzhi Li, Madison, NJ (US);
Angela Lan Chiu, Holmdel, NJ (US);
Chris Dailey, Matthews, NC (US);
Robert Duncan Doverspike, Tinton Falls, NJ (US); Monica Naukam Gerhardstein, Troy, MI (US); Dah-Min David Hwang, Holmdel, NJ (US);
Dongmei Wang, Madison, NJ (US);
Dahai Xu, Livingston, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 691 days.

(21) Appl. No.: 12/901,767

(22) Filed: Oct. 11, 2010

(65) Prior Publication Data
US 2012/0087665 A1 Apr. 12, 2012

(51) Int. Cl.
*H04L 12/24* (2006.01)
*H04J 14/02* (2006.01)
*H04L 12/751* (2013.01)
*H04L 12/721* (2013.01)

(52) U.S. Cl.
CPC ............ *H04L 41/22* (2013.01); *H04J 14/0269* (2013.01); *H04J 14/0284* (2013.01); *H04J 14/0286* (2013.01); *H04L 41/12* (2013.01); *H04L 45/02* (2013.01); *H04L 45/12* (2013.01); *H04J 14/0212* (2013.01); *H04J 14/0217* (2013.01); *H04J 14/0256* (2013.01)
USPC ............ 370/238; 370/252; 370/328; 715/736

(58) Field of Classification Search
CPC ... H04J 14/0279; H04J 14/02; H04J 14/0217; H04J 45/12; H04J 45/123; H04J 45/124
USPC ......................................... 370/229, 231, 238
See application file for complete search history.

(56) References Cited

U.S. PATENT DOCUMENTS

| | | | |
|---|---|---|---|
| 7,221,871 B2 * | 5/2007 | Richards et al. ................ 398/81 |
| 2003/0020977 A1 * | 1/2003 | Smith et al. ................... 359/110 |
| 2005/0069314 A1 * | 3/2005 | De Patre et al. .................. 398/5 |
| 2005/0281271 A1 * | 12/2005 | Beshai et al. ................. 370/400 |
| 2008/0019691 A1 * | 1/2008 | Guignard et al. ............... 398/48 |

OTHER PUBLICATIONS

E. Modlano and P. Lin, "Traffic grooming in WDM networks," *IEEE Communications Magazine*, vol. 39, No. 7, 124-129, Jul. 2001.
H. Zhu, H. Zhang, K. Zhu, and B. Mukherjee, "A novel graph model for dynamic traffic grooming in WDM mesh networks," *Proc. Globecom '02*, Taipei, pp. 2681-2685, Nov. 2002.
O. Gerstel, P. Lin, and G. Sasaki, "Combined WDM and SONET network design," *Proc. INFOCOM '98*, San Francisco, CA, pp. 94-101, Apr. 1998.

(Continued)

*Primary Examiner* — Un C Cho
*Assistant Examiner* — Siming Liu

(57) ABSTRACT

A method and apparatus for providing a route recommendation are disclosed. For example, the method obtains network topology information, wherein the network topology information comprises a plurality of underlying subnetwork types for a network. The method creates a cost model for the network, and receives a request from a user for a connection to be supported by the network. The method provides the route recommendation for supporting the connection by applying the cost model.

17 Claims, 6 Drawing Sheets

(56) References Cited

OTHER PUBLICATIONS

O. Gerstel, R. Ramaswami, and G. Sasaki, Cost effective traffic grooming in WDM rings, *IEEE/ACM Transaction on Networking*, vol. 8, pp. 618-630, Oct. 2000.

V. R. Konda and T. Y. Chow, "Algorithm for traffic grooming in optical networks to minimize the number of transceivers," in *Proc. IEEE Workshop High Performance Switching and Routing*, pp. 218-222, May 2001.

S. Thaigaran and A. Somani, "Capacity fairness of WDM networks with grooming capabilities," *SPIE Opt. Networks Mag.*, vol. 2, pp. 24-31, May/Jun. 2001.

R. Srinivasan and A. K. Somani, "A generalized framework for analyzing time-space switched optical networks," *IEEE J. Select. Areas Commun.*, vol. 20, pp. 202-215, Jan. 2002.

K. Zhu and B. Mukherjee, "On-line approaches for provisioning connections of different bandwidth granularities in WDM mesh networks," in *Proc. OFC*, pp. 549-551, Mar. 2002.

D. Shen, G. Li, A. Chiu, D.-M. Hwang, D. Xu, D. Hwang, C.-K., Chan and R. Doverspike, "On Multiplexing Optimization in DWDM Networks," *OSA/OFC/NFOEC* 2011, consists of 3 unnumbered pages, 2011.

\* cited by examiner

METHOD AND APPARATUS FOR PROVIDING A ROUTE RECOMMENDATION

FIELD OF THE DISCLOSURE

The present disclosure relates generally to a software tool implemented on a computing device for recommending a route to support a connection between termination points, e.g., between two network offices.

Due to technology evolution and industry consolidation, a carrier's transport network may include several types of sub-networks, e.g., Dense Wavelength Division Multiplexer (DWDM) sub-networks. Different sub-networks can be deployed by using equipment from different vendors with different supporting technologies, such as 8 wavelengths with OC48 per wavelength system, 16 wavelengths with OC48 per wavelength system, 32 wavelengths with OC48 per wavelength system, 80 wavelengths with OC48 per wavelength system, 40 wavelengths with OC192 per wavelength system, 80 wavelengths with OC768 per wavelength system, and so on. However a user requesting a connection is only concerned with the end-to-end connectivity and is not aware of the underlying technologies or sub-networks supporting the connection. For example, a user requesting a connection between New York City and San Francisco is only concerned with the connectivity and the requested bandwidth or capacity being satisfied by the connection. It is the carrier's duty to optimize its own transport network to provide the connection with a high level of network availability. However, the carrier or service provider may support the connection using a number of different routes. Thus, it is possible that a carrier may support the connection in a possibly un-optimized manner, thereby incurring a higher operating cost.

SUMMARY

In one embodiment, the present disclosure is a method and apparatus for providing a route recommendation. For example, the method obtains network topology information, wherein the network topology information comprises a plurality of underlying subnetwork types for a network. The method creates a cost model for the network, and receives a request from a user for a connection to be supported by the network. The method provides the route recommendation for supporting the connection by applying the cost model.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for recommending a route to support a connection between termination points, e.g., between two network offices. As discussed above, it is the carrier's duty to optimize its transport network to save cost while providing a high level of network availability to meet a request of a user.

It should be noted that point-to-point DWDM sub-networks normally support OC48 connections, which is 2.5 Gbps per wavelength. Some recent ROADM-based sub-networks may support OC1921/OC768, which is 10 Gbps/40 Gbps per wavelength. However, a large portion of existing connections are still at lower speed, such as OC48. Thus, a carrier has to multiplex those lower speed connections into high speed wavelength lightpaths in the Multi-degree Reconfigurable Optical Add/Drop Multiplexer (ROADM) networks. Inside a wavelength lightpath, each lower speed connection occupies one sub-channel. For example, if a wavelength lightpath is rated at 10 Gbps, and one sub-channel is rated at 2.5 Gbps, then there are four (4) sub-channels inside each wavelength lightpath.

One challenge is to determine how to route each OC48 connection in the transport network and how to multiplex those lower speed connections optimally such that the total network cost is minimized. Namely, the network routing and multiplexing problem can be stated as follows: given a network configuration (including multiple vendor domains, terminal and through optical transponder (OT) costs, network status, as well as multiplexing capability) and at least one connection specific requirement (e.g., a requested bandwidth or capacity), it is necessary to determine how to route the connection with the available capacity and how to setup lightpaths in the underlying domains, e.g., the ROADM domains, to satisfy the connection request. One objective is to minimize the total network cost for a certain period.

In the present disclosure, the method will take into account several constraints simultaneously and provide integrated heuristics to solve the problem. In one embodiment, a cost model, e.g., a network cost graph, is created from the network configuration of a network. The method then assigns graph edge cost according to different heuristics, and then using a shortest path algorithm selects the routing path. Using the network topology information and the cost model, the present method can automatically extract where to route the connection over the DWDM sub-networks, where to route the connection over the ROADM sub-networks, where to use existing available sub-channels, and where to create new lightpaths, if necessary, where to add regenerators, and what the total investment cost will be. All of this information is very helpful for a network planner.

Figure 1:
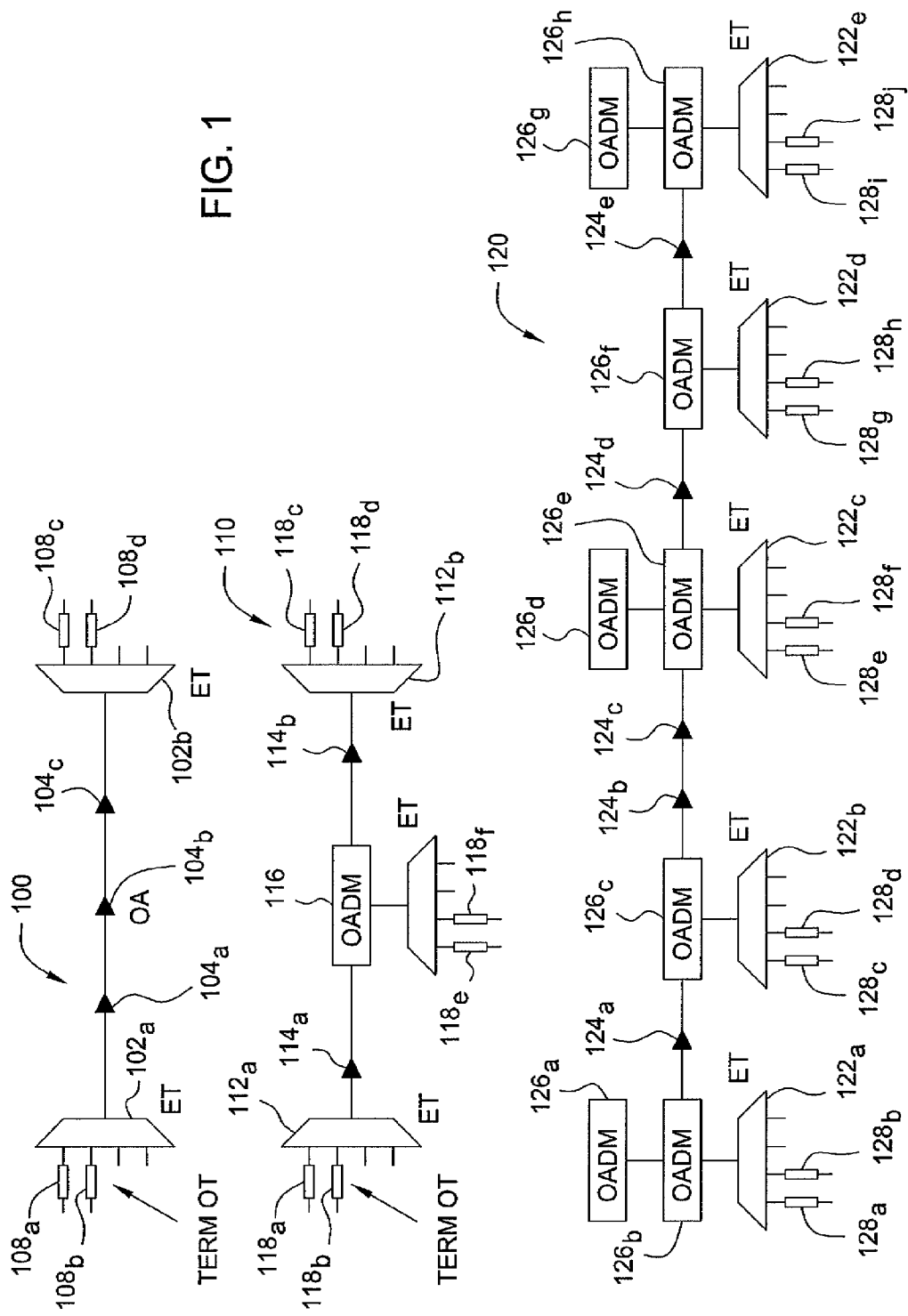
FIG. 1 is a block diagram illustrating a plurality of different types of sub-networks.

As discussed above, a carrier or service provider may have many sub-networks. For example, FIG. 1 is a block diagram illustrating a plurality of different types of sub-networks 100, 110, and 120. Although only three types of sub-networks are illustrated, the present disclosure is not so limited. Namely, other type of subnetworks may exist and are within the scope of the present disclosure.

Different sub-networks may have different technologies and they can be deployed using equipment from different vendors. Different sub-networks may or may not be located at the same locations. FIG. 1 shows three illustrative types of DWDM sub-networks. Where "ET" stands for end terminal (e.g., 102a, 102b, 112a, 112b, 122a, 122b, 122c, 122d, and 122e), "OA" stands for optical amplifier (e.g., 104a, 104b, 104c, 114a, 114b, 124a, 124b, 124c, 124d, and 124e), "OADM" stands for optical add/drop multiplexer (e.g., 116, 126a, 126b, 126c, 126d, 126e, 126f, 126g, and 126h, and "OT" stands for optical transponder that is an optical-electrical-optical device (e.g., 108a, 108b, 108c, 108d, 118a, 118b, 118c, 118d, 118e, 118f, 128a, 128b, 128c, 128d, 128e, 128f, 128g, 128h, 128i, and 128j). Subnetwork 100 is a point-to-point DWDM subnetwork with two end terminals. It should be noted that there is no express traffic across these sub-networks, where express traffic means an optical signal traveling more than one optical links without regeneration.

In one embodiment, subnetwork 110 is an optical add-drop multiplexer (OADM) subnetwork, where an optical signal can pass through multiple OADMs without regeneration and traffic can be added or dropped at any OADM location. Subnetwork 120 is a multi-degree ROADM-based DWDM subnetwork, where the optical signal can travel from one location to any other location as long as the same wavelength is available in the route links. As long as the traveling distance is in the range of the reach limitation, no regeneration is required in the middle of the subnetwrok. In other words, regeneration is only needed when the distance exceeds the reach limitation. Such regeneration device is referred as a regenerator. In FIG. 1, ET, OA, and OADM are pre-installed shared equipments, while OTs and regenerators are installed when a circuit is turned-on.

Figure 2:
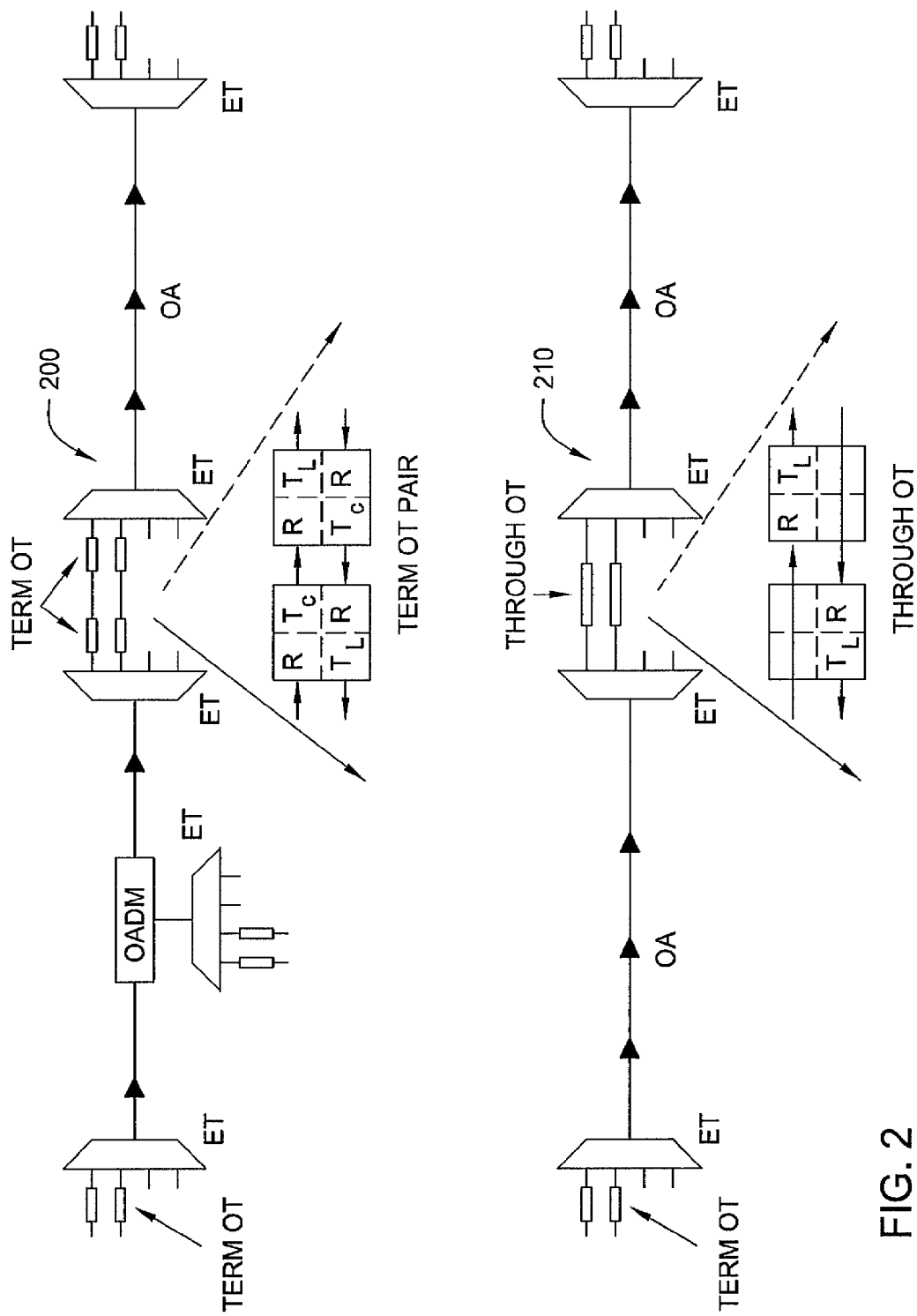
FIG. 2 is a block diagram illustrating a plurality of different types of optical transponders that are used to connect different types of sub-networks.

In one embodiment, when a circuit travels across more than one sub-network, optical transponders (OT) are needed. If two adjacent sub-networks use different technologies, a back-to-back "term OT" pair is required. FIG. 2 is a block diagram illustrating a plurality of different types of optical transponders 200 and 210 that are used to connect different types of sub-networks.

When two adjacent sub-networks use the same technology, e.g., from the same vendor, a simpler "through OT" 210 would be enough. Often the cost of one "through OT" 210 is cheaper than the total cost of two "term OTs" 200 for the same technology. When a closer look is taken at the "term OT" pair and "through OT", it is generally the case that the "through OT" could save two receivers and two client transmitter components, which will make a single "through OT" cheaper than two "term OTs" of the same technology. For multi-degree ROADM sub-networks, the required regenerator is also through OT since it connects optical signals from the same technology. Thus during circuit routing in a heterogeneous transport network, it is preferable to route the circuit (broadly a connection) over the same type of sub-network as much as possible to save optical transponder cost because the optical transponders are expensive devices. It consumes the majority of the capital cost.

After a route is decided for a circuit, engineers are dispatched to different offices to establish the circuit using inventory optical transponders. Since most of circuits will last for a long time, such work overhead is acceptable. Inside a carrier's network footprint, an office may have many end terminal devices for different sub-networks. With clear identification, an engineer can easily establish a circuit connecting two ETs inside each office via OT/regenerators.

If one sub-network has pre-installed OT/regenerators, and the sub-network management system is able to select/connect its OT/regeneratos automatically, there is no need to dispatch an engineering to the offices. The software tool should inform the sub-network management system on the path selection of the two offices crossing the sub-network, the sub-network management system would establish the circuit inside the sub-network automatically.

Figure 3:
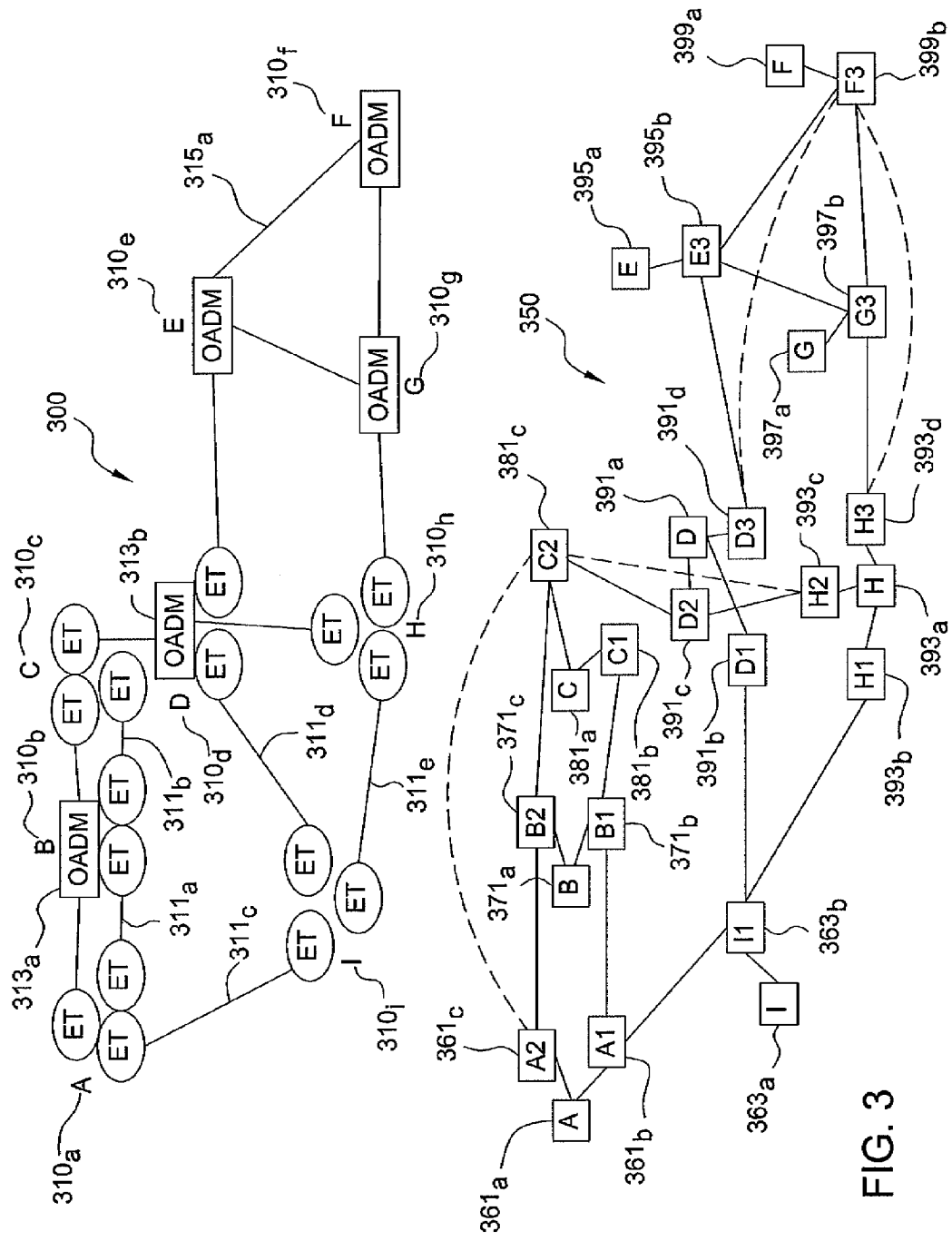
FIG. 3 is a block diagram illustrating an illustrative network topology graph and its associated network cost graph.

FIG. 3 is a block diagram illustrating an illustrative network topology graph 300 and its associated network cost graph 350 (broadly a cost model). It should be noted that a connection over the heterogeneous DWDM network can be routed over multiple sub-networks and may require several OTs to connect them.

In one embodiment, the present disclosure only considers the costs of optical transponders required to establish the connection, for example, the "term OT", and "through OT" costs. However, the present disclosure is not so limited and that other costs can be considered in conjunction with the costs of the optical transponders. In one embodiment, in order to find the most cost-efficient routes for connections considering both "term OT" and "through OT", the present method creates a network cost graph for a given network state. In turn, the route for a connection request is computed based on the network cost graph.

In one embodiment, $G(V, E)$ is used to denote a given network state, where V denotes the network offices and E denotes the network links including system links and express links, where an express link means a regeneration-free route. $G'(V',E')$ is used to denote the corresponding network cost graph, where V' is the vertex set and E' is the edge set. In one embodiment, inside each network office, there may be many different types of sub-networks terminating at this office. Then for each office i in G, corresponding $N_i+1$ vertexes are created in G' assuming there are $N_i$ sub-network types terminating at office i, where one vertex is for traffic termination and $N_i$ vertexes for the $N_i$ sub-network types. Then, there is a total of $\Sigma i\, (N_1+1)$ vertexes in G'.

Next, edges are created among the $N_i+1$ vertexes for G'. From the traffic termination vertex, one edge is made to each of the $N_i$ sub-network type vertexes with (termOT_cost-throughOT_cost/2) of the corresponding sub-network type. Since half of the "throughOT" cost should not be more expensive than one "termOT" cost of the same sub-network type, this relationship should not produce a negative value. For any link of E with an available capacity, one can first identify the specific sub-network type and its two end offices. Then one can locate the corresponding two vertexes and create one edge between them with the cost of one "through OT." Then, there is a total $\Sigma i\, Ni_+|E|$ edges, where |E| means the total number of links in G, including DWDM system links and express links. It can be verified that a connection route from one traffic termination vertex to another traffic termination vertex will have the corresponding optical transponder cost.

FIG. 3 shows one illustrative example of a network topology graph 300 and its associated network cost graph 350. It should be noted that network topology graph 300 is only illustrative and should not be interpreted as a limitation to the present disclosure.

For example, in the network topology graph 300, there are nine (9) network offices (broadly also referred to as nodes), named from A to I (310a-310i), and there are 3 types of DWDM systems or subnetworks: the first type comprises point-to-point DWDM systems, e.g., A-B (311a), B-C (311b), A-I (311c), I-D (311d), and I-H (311e); the second type comprises degree-2 OADM systems, A-B-C (313a) and C-D-H (313b); the third type comprises multi-degree OADM systems, H-G-F-E-D-G (315a). In one embodiment, for the third multi-degree OADM system, due to optical reachibility constraints, it is assumed that there are only two express links HGF and DEF.

In one embodiment referring to the network cost graph 350, since node A has two sub-network types, type1 and type2, three (3) vertexes, A (361a), A1(361b), and A2 (36c) are created, while node B only has two sub-network types terminating here, three (3) vertexes, B (371a), B1 (371b), B2 (371c) are created for node B. Since Node C has two sub-network types, three (3) vertexes C (381a), C1 (381b), and C2 (381c) are created. Although Node I has three sub-networks terminating here, but they are all of the same sub-network type. As such, only two vertexes I (363a) and I1 (363b) are created. Similarly it is noted that both node D and node H have all three sub-network types while each of nodes E, F, G only has sub-network type3 terminating here. Thus, four (4) vertexes D (391a), D1 (391b), D2 (391c) and D3 (391d), and H (393a), H1 (393b), H2 (393c) and H3 (393d) are created for nodes D, and H, respectively. Similarly, two (2) vertexes E (395a), E3 (395b), and F (397a), F3 (397b), and G (399a), G3 (399b), are created for nodes E, F and G, respectively.

An example as to how a cost can be computed for a route using the network cost graph 350 will now be described. For example, suppose a connection from node A to node F through nodes B, C, D, E is contemplated or requested. The total OT cost would include 2 "TermOT" of type2, one "ThroughOT" of type2, 2 "TermOT" of type3. From the network cost graph 350, it can be seen that the edge AA2 has the cost of (termOT_cost-throughOT_cost/2) of type2, edge A2C2 has the cost of one throughOT of type2, edge C2D2 has the cost of one throughOT of type2, edge DD2 has the cost of (termOT_cost-throughOT_cost/2) of type2, edge DD3 has the cost of (termOT_cost-throughOT_cost/2) of type3, edge D3F3 has the cost of one throughOT of type3, and edge F3F has the cost of (termOT_cost-throughOT_cost/2) of type3. Summing these costs together, one will arrive at the final cost of 2 termOT of type2, plus 1 throughOT of type2, and plus 2 termOT of type3. It should be noted that although not specifically specified in the present disclosure, the termOT_cost and throughOT_cost are real costs representing the actual cost of these OTs. It should be noted that in one embodiment the termOT_cost and throughOT_cost comprise the actual purchase costs, but it may optionally include other costs, e.g., the installation cost for installing the OTs, the transportation or shipping costs for the OTs, and the like.

It should be noted that in the example above, one may account for all the equipment cost including the termOT and throughOT. in one embodiment, carriers may also consider shared common cost, which can be calculated as mileage of the inter-city link times per-wavelength-mile common cost. Thus, in the network cost graph 350, shared common cost can be added to the cost of the inter-city links.

In one embodiment, the present disclosure accounts for multiplex optimization. For example, in FIG. 3, if one assume that both type1 and type2 sub-networks can support both OC48 wavelength and OC192 wavelength while type3 can support only OC192 wavelength, then multiplexing planning over type3 sub-network to support OC48 connections will be needed. In one embodiment, multiplexing planning is defined as the process of grouping multiple sub-wavelength channels into a single wavelength channel. The optimization objective is to minimize the overall cost of the network. The multiplexing optimization problem has demonstrated to be computationally intractable in the general case. Hence heuristic solutions can be used.

In the above example for the type3 sub-network segment, it is assumed that there is one OC48 connection from H to G and one OC192 lightpath H-G that is created. Then lightpath H-G has three sub-channels left. For another OC48 connection from H to F, one must consider whether to create one direct OC192 lightpath from H to F, or to reuse the existing lightpath H-G and to create one OC192 lightpath from G to F. Different choices may result in different costs.

In one embodiment, the present disclosure considers a plurality of different multiplexing policies. Depending on the goals of a carrier, the calculation of an optimized route using the network cost graph 350 can be optimized using any one of the different multiplexing policies as discussed below.

In one embodiment, all policies are applied on the same network cost graph, where all potential multiplexing lightpaths are treated as one sub-network with each link having "n" number of sub-channles, e.g., four (4) sub-channels. Then different costs are assigned to those links according to different policies and the present method will run a least cost routing algorithm to select the most cost-efficient route.

One multiplexing policy is the "investment cost policy." Under the "investment cost policy", the first sub-channel of a multiplexing lightpath is responsible for the entire lightpath cost and the other sub-channels of the multiplexing lightpath are deemed to be free. One reason for this approach is that OT capital investment and wavelength resource are only needed during multiplexing lightpath creation for the first sub-channel request. Then, for the network cost graph, the total OT cost and common cost are assigned to the new multiplexing lightpath edges and no cost will be assigned to existing multiplexing lightpaths edges. Such a policy tends to attract OC48 connections to use hop across multiple multiplexing lightpaths.

Another multiplexing policy is the "average cost policy." Under the "average cost policy", the 4 sub-channels share the multiplexing lightpath cost evenly. Then for the network cost graph, one fourth of the total OT cost and common cost are assigned to all multiplexing lightpath edges including new and existing ones. Such a policy tends to encourage the setting up of new multiplexing lightpaths.

Another multiplexing policy is the "weighted cost policy." Under the "weighted cost policy", 4 sub-channels share the multiplexing lightpath cost unevenly, e.g., with decreasing weight such as 1:2:3:4 =40:30:20:10. It should be noted that this weighting example is only illustrative. Namely, different weighing ratios can be selected. Then for the network cost graph, 40% of the total OT cost and common cost are assigned to new multiplexing lightpath edges, 30% of the total cost is assigned to existing multiplexing lightpaths edges with 3 free sub-channels, 20% of the total cost is assigned to existing multiplexing lightpaths edges with 2 free sub-channels, and 10% of the total cost is assigned to existing multiplexing lightpaths edges with the last available sub-channel. Such a policy is trying to strike a balance between the investment cost and the average cost policies as discussed above.

Another multiplexing policy is the "major-minor cost policy." It should be noted that the previous three policies did not consider any traffic pattern. Under the "major-minor cost policy", traffic pattern will be considered. For example, under this policy, network nodes are initially classified as a major node or a minor node based on the traffic supported by the respective node. For example, one can classify nodes that are used to support 40% (broadly a selectable threshold of a percentage of the network's overall traffic) of the total traffic of the network as being major nodes and others as minor node. Again, this example is only illustrative and should not be interpreted as a limitation. Once classified, major and minor nodes can be assigned different cost combination weights. For example, Major-Major: 1:2:3:4=35:30:20:15, Minor-Minor: 1:2:3:4=60:20:10:10, and Major-Minor: 1:2:3:4=47.5: 25:15:12.5. The basic idea is to encourage multiplexing lightpaths between major-major node pair and discourage multiplexing lightpaths between minor-minor node pair.

Figure 4:
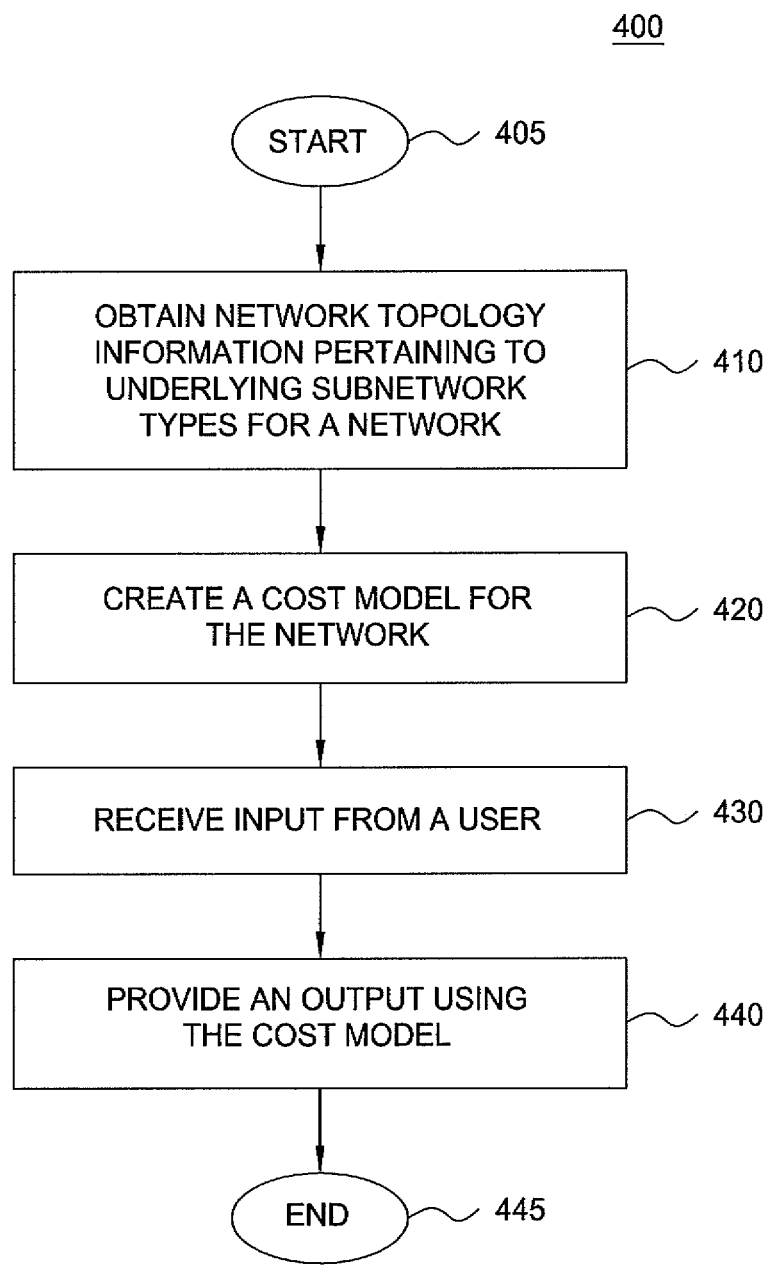
FIG. 4 is a flow diagram illustrating one embodiment of a method for providing a route recommendation.
Figure 6:
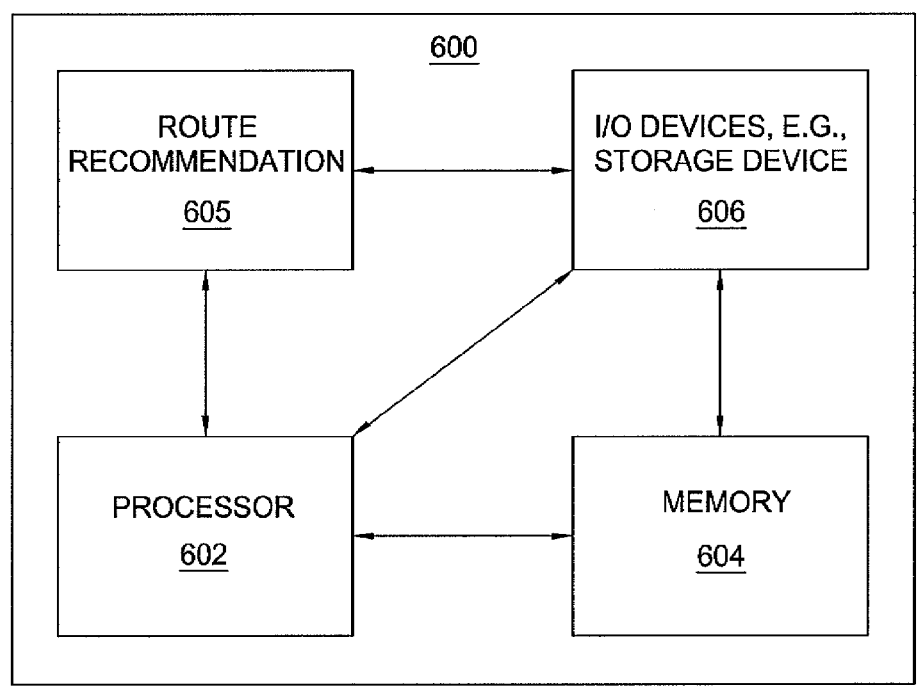
FIG. 6 is a high level block diagram of the route recommendation method that is implemented using a general purpose computing device.

FIG. 4 is a flow diagram illustrating one embodiment of a method 400 for providing a route recommendation. The method 400 may be implemented, for example, in a general purpose computing device or an application server as illustrated in FIG. 6 below. The general purpose computing device or the application server can be a standalone device or it can be a device that is accessible via a communication network.

The method 400 is initialized at step 405 and proceeds to step 410, where network topology information pertaining to the underlying subnetwork types for a network is obtained, e.g., from a database.

In step 420, method 400 creates a network cost graph (broadly a cost model) as discussed above for the network. In one embodiment, any one of the above discussed multiplexing policies can be implemented with the network cost graph.

In step 430, once the network cost graph has been created for a network, it can be used to provide a route recommendation based upon received inputs. For example, in step 430, method 400 receives inputs from a user. The input may comprise a starting node, an ending node and a bandwidth requirement that will be need for a connection or circuit connecting the starting node and the ending node. Broadly, method 400 may receive a request from a user for a connection to be supported by the network. For example, a user may provide the input of needing a connection between New York City and San Francisco with a bandwidth requirement of 2.5 Gbps.

In step 440, method 400 provides an output using the network cost graph that will provide one or more route recommendations. Broadly, method 400 provides at least one route recommendation for supporting a requested connection by applying the cost model. For example, method 400 may recommend a route that traverses from New York City to Chicago and then to San Francisco. This route recommendation may incur the least cost to the carrier operating the underlying network. In one embodiment, method 400 may provide a plurality of route recommendations in an order of increasing costs. For example, method 400 may recommend a route that traverses from New York City to Atlanta and then to San Francisco. Although this route recommendation may in fact be the lowest cost, the user may want to see other route recommendations to ensure that other parameters are considered. For example, the capacity in the route between New York City and Atlanta can be reserved for other future uses and a more direct route (possibly at a slightly higher cost) may be more appropriate to satisfy the requested connection. The method 400 then terminates in step 445.

It should be noted that although not explicitly specified, one or more steps of the method 400 described above may include a storing, displaying and/or outputting step as required for a particular application. In other words, any data, records, fields, and/or intermediate results discussed in the method can be stored, displayed, and/or outputted to another device as required for a particular application or for a particular device.

In one embodiment, the present disclosure provides a graphic visualization interface. This graphic visualization interface is able to show current network status for different sub-networks as well as their combinations. Jointed with imbedded physical layer fiberspan routes and sub-network capacity consumption model, the graphic visualization interface can further show detailed fiberspan routing to check shared risk link group relationship and sub-network exhaustive hot-spots on a map, e.g., a map of a continent, a country, a region, a state, a county, a city and the like. When a planner inputs two end offices (broadly two nodes) with the required capacity and other constraints, the graphic visualization interface will automatically show a few cost-efficient routes crossing multiple sub-networks for the planner to choose on the map, including in one embodiment, the termOTs and throughOTs locations and the sub-network wavelengths. This graphic visualization interface enables the planners to make more informative and intelligent decisions with greater productivity, thereby saving costs.

Figure 5:
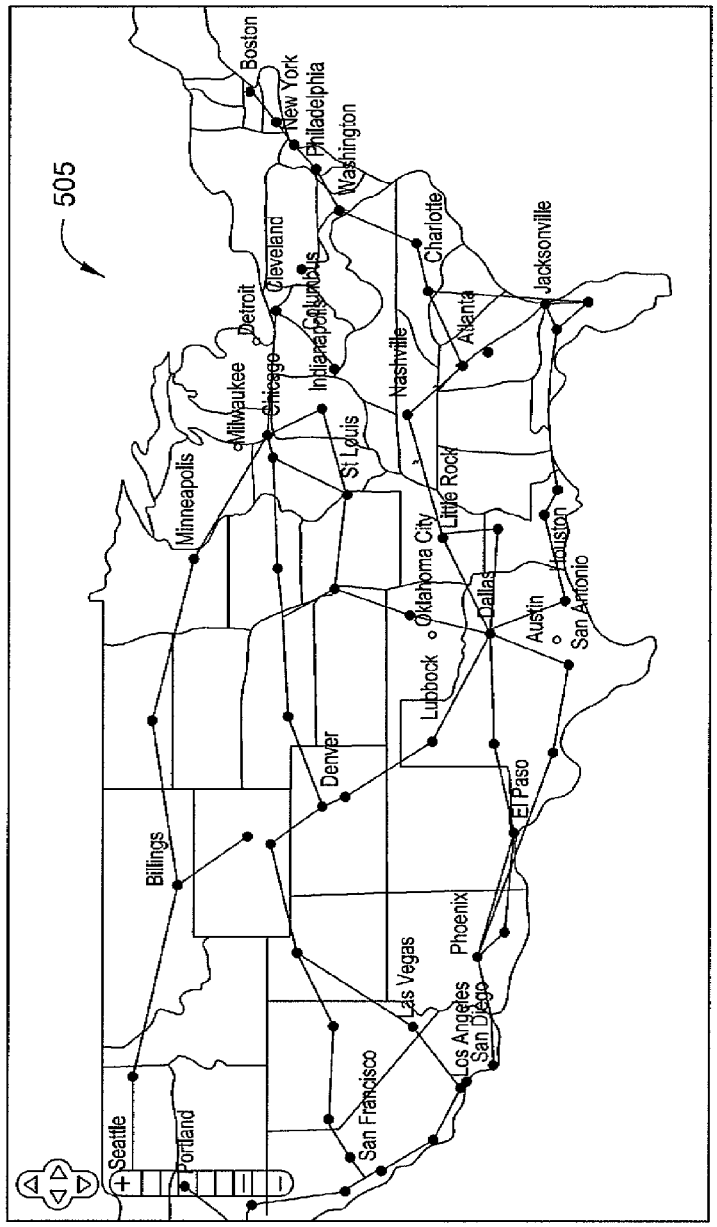
FIG. 5 is an illustrative user interface implemented via a display screen.

FIG. 5 is an illustrative user interface 500 implemented via a display screen. In one embodiment, the user interface 500 provides a number of input fields 510, 520, 530, 540 and 550. For example, input field 510 allows a user to input a starting node, whereas input field 520 allows a user to input an ending node. Input field 530 allows a user to input a bandwidth or capacity requirement, e.g., 2.5 Gbps, OC48, and so on. Input field 540 allows a user to input the number of route recommendations that the user wants the tool to provide, e.g., 10 route recommendations and so on. Input field 550 allows a user to input various additional information that the user may want to see in the display area 505. In this illustrative example, the map of the United States is displayed along with major cities, links, and so on. It should be noted that any number of network parameters can be displayed depending on the requirements of a specific implementation. A button 545 is provided to the user to start the process of providing the one or more route recommendations once all of the inputs are provided. Finally, the user interface 500 provides an area 560 to display the route recommendations. The route recommendations can be displayed in any number of formats, e.g., the nodes that are traversed, the cities that are traversed, the node identifications, the overall cost for each route recommendation, and so on. In one embodiment, each route recommendation is graphically presented on the display area 505. For example, different colors can be used to represent different costs of the route recommendations, e.g., lower cost route recommendations are colored in green and higher cost route recommendations are colored in red. It should be noted that the present disclosure is not limited in any way by this illustrative example of the user interface 500.

FIG. 6 is a high level block diagram of a route recommendation method that is implemented using a general purpose computing device 600. The general purpose computing device 600 may be part of a network device or a standalone device. In one embodiment, the general purpose computing device 600 comprises a processor 602, a memory 604, a route recommendation module 605 and various input/output (I/O) devices 606 such as a display, a keyboard, a mouse, a modem, a stylus, a joystick, a keypad, controller, a network interface, and the like. In one embodiment, at least one I/O device is a storage device (e.g., a disk drive, an optical disk drive, a floppy disk drive). It should be understood that the route recommendation module 605 can be implemented as a physical device or subsystem that is coupled to a processor through a communication channel.

Alternatively, the route recommendation module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the route recommendation module 605 described herein with reference to the preceding figures can be stored on a non-transitory computer readable storage medium (e.g., RAM, magnetic or optical drive or diskette, and the like).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a route recommendation, comprising:
    obtaining, via a processor, network topology information, wherein the network topology information comprises a plurality of underlying subnetwork types for a network, wherein the plurality of underlying subnetwork types is based on different technologies, wherein one of the plurality of underlying subnetwork types comprises a multi-degree reconfigurable optical add/drop multiplexer subnetwork;
    creating a cost model for the network, wherein the cost model is based on optical transponder costs, wherein each of the optical transponder costs is associated with one of the plurality of underlying subnetwork types;
    receiving, via the processor, a request from a user for a connection to be supported by the network; and
    providing, via the processor, the route recommendation for supporting the connection by applying the cost model and the network topology information.

2. The method of claim 1, wherein the optical transponder costs comprise a term optical transponder cost and a through optical transponder cost.

3. The method of claim 1, wherein the network topology information further comprises a plurality of nodes of the network.

4. The method of claim 3, wherein the plurality of nodes of the network comprises a plurality of end offices of the network.

5. The method of claim 3, wherein the cost model comprises at least one vertex for each of the plurality of nodes of the network.

6. The method of claim 5, wherein the at least one vertex for one of the plurality of nodes of the network comprises a plurality of vertexes if the one node has a plurality of different underlying subnetwork types terminating at the one node.

7. The method of claim 1, wherein one of the plurality of underlying subnetwork types comprises a point-to-point dense wavelength division multiplexer subnetwork with two end terminals.

8. The method of claim 1, wherein one of the plurality of underlying subnetwork types comprises an optical add-drop multiplexer subnetwork.

9. The method of claim 1, wherein the cost model employs a multiplexing policy.

10. The method of claim 9, wherein the multiplexing policy comprises an investment cost policy.

11. The method of claim 9, wherein the multiplexing policy comprises an average cost policy.

12. The method of claim 9, wherein the multiplexing policy comprises a weighted cost policy.

13. The method of claim 9, wherein the multiplexing policy comprises a major-minor cost policy that accounts for a traffic pattern in the network.

14. The method of claim 1, wherein the route recommendation is presented in a graphical user interface.

15. The method of claim 14, wherein the route recommendation is presented on a map in the graphical user interface.

16. A non-transitory computer readable medium storing a plurality of instructions which, when executed by a processor, cause the processor to perform operations for providing a route recommendation, the operations comprising:
    obtaining network topology information, wherein the network topology information comprises a plurality of underlying subnetwork types for a network, wherein the plurality of underlying subnetwork types is based on different technologies, wherein one of the plurality of underlying subnetwork types comprises a multi-degree reconfigurable optical add/drop multiplexer subnetwork;
    creating a cost model for the network, wherein the cost model is based on optical transponder costs, wherein each of the optical transponder costs is associated with one of the plurality of underlying subnetwork types;
    receiving a request from a user for a connection to be supported by the network; and
    providing the route recommendation for supporting the connection by applying the cost model and the network topology information.

17. An apparatus for providing a route recommendation, comprising:
    a processor, and
    a computer readable medium storing a plurality of instructions which, when executed by the processor, cause the processor to perform operation, the operations comprising:
        obtain network topology information, wherein the network topology information comprises a plurality of underlying subnetwork types for a network, wherein the plurality of underlying subnetwork types is based on different technologies, wherein one of the plurality of underlying subnetwork types comprises a multi-degree reconfigurable optical add/drop multiplexer subnetwork;
        create a cost model for the network, wherein the cost model is based on optical transponder costs, wherein each of the optical transponder costs is associated with one of the plurality of underlying subnetwork types;
        receive a request from a user for a connection to be supported by the network; and
        provide the route recommendation for supporting the connection by applying the cost model and the network topology information.

* * * * *